(12) United States Patent
Lin

(10) Patent No.: US 8,212,926 B2
(45) Date of Patent: Jul. 3, 2012

(54) TV SIGNAL DETERMINING SYSTEM, TV SIGNAL PROCESSING SYSTEM UTILIZING WHICH AND METHOD THEREOF

(75) Inventor: Hung-Shih Lin, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 1272 days.

(21) Appl. No.: 11/849,363

(22) Filed: Sep. 4, 2007

(65) Prior Publication Data

US 2009/0059075 A1     Mar. 5, 2009

(51) Int. Cl.
  *H04N 5/46* (2006.01)
(52) U.S. Cl. .......................... 348/558; 348/557; 348/572
(58) Field of Classification Search .................. 348/558, 348/554, 555, 725, 557, 572, 573; *H04N 5/46, H04N 3/27, 5/44*
See application file for complete search history.

(56) References Cited

U.S. PATENT DOCUMENTS

| | | | |
|---|---|---|---|
| 4,438,451 A | | 3/1984 | Hinn |
| 5,134,483 A | * | 7/1992 | Imbert et al. ................... 348/558 |
| 5,192,997 A | | 3/1993 | Imbert |
| 5,661,527 A | * | 8/1997 | Ferguson ....................... 348/558 |
| 5,784,117 A | | 7/1998 | Mitarai |
| 6,483,550 B1 | * | 11/2002 | Murata et al. .................. 348/572 |
| 7,916,215 B2 | * | 3/2011 | Wu et al. ........................ 348/558 |
| 2006/0279658 A1 | | 12/2006 | Wu |

* cited by examiner

*Primary Examiner* — Sherrie Hsia

(74) *Attorney, Agent, or Firm* — Winston Hsu; Scott Margo

(57) ABSTRACT

A TV signal determining system utilized for determining a type of a TV signal includes: a detection unit, for utilizing a predetermined profile to detect if the TV signal has a signal segment corresponding to the predetermined profile to generate a detection result signal; and a determining unit, coupled to the detection unit, for determining the type of the TV signal according to the detection result signal. A TV signal processing system utilizing the TV signal determining system and a related method are also disclosed.

18 Claims, 3 Drawing Sheets

TV SIGNAL DETERMINING SYSTEM, TV SIGNAL PROCESSING SYSTEM UTILIZING WHICH AND METHOD THEREOF

BACKGROUND OF THE INVENTION

1. Field of the Invention

The present invention relates to a TV signal determining system, a TV signal processing system utilizing which and method thereof, and particularly relates to a TV signal determining system for determining the type of TV signal according to the profile thereof, a TV signal processing system utilizing which and method thereof.

2. Description of the Prior Art

FIG. 1 is a block diagram illustrating a prior art TV signal processing system 100. As shown in FIG. 1, the TV signal TS is first sampled by an ADC (analog to digital converter) 101 and then processed by a video decoder 103.

As known by persons skilled in the art, a TV signal includes a color sub-carrier, and a frequency of which varies corresponding to a standard thereof (for example, PAL, NTSC, and SECAM). If the video decoder 103 wants to correctly decode the TV signal, the standard of the TV signal must be obtained first, thus the frequency of the color sub-carrier should be detected before decoding. Conventionally, if the video decoder 103 wants to detect the frequency of the color sub-carrier, it must lock the h-sync signal and v-sync signal of the TV signal first, thereby obtaining the color sub-carrier with the correct timing. Then a PLL (Phase Lock Loop) circuit must be utilized to lock the frequency and phase of the color sub-carrier such that a level of VCO can be obtained and the frequency of the color sub-carrier can be detected.

However, such a mechanism for detecting the frequency of a color sub-carrier is complicated and needs a lot of time.

SUMMARY OF THE INVENTION

Therefore, one objective of the present invention is to provide a TV signal determining system, which detects a profile of a TV signal to determine the type of TV signal.

Another objective of the present invention is to provide a TV signal processing system, which utilizes the detection result from the above-mentioned TV signal determining system to process a TV signal.

One embodiment of the present invention discloses a TV signal determining system, which is used for determining the type of a TV signal, which comprises: a detection unit, for utilizing a predetermined profile to detect if the TV signal has a signal segment corresponding to the predetermined profile to generate a detection result signal; and a determining unit, coupled to the detection unit, for determining the type of the TV signal according to the detection result signal.

Another embodiment of the present invention also discloses a TV signal determining method corresponding to the above-mentioned system. The TV signal determining method comprises: utilizing a predetermined profile to detect if the TV signal has a signal segment corresponding to the predetermined profile to generate a detection result signal; and determining the type of TV signal according to the detection result signal.

Another embodiment of the present invention discloses a TV signal determining system, which comprises: a detection unit, for utilizing a predetermined profile to detect if the TV signal has a signal segment corresponding to the predetermined profile to generate a detection result signal; and a video decoder, coupled to the detection unit, for processing the TV signal according to the detection result signal.

The present invention also discloses a TV signal processing method corresponding to the above-mentioned system. The TV signal processing method comprises: utilizing a predetermined profile to detect if the TV signal has a signal segment corresponding to the predetermined profile to generate a detection result signal; and decoding the TV signal according to the detection result signal.

According to above-mentioned systems and methods, the type of the TV signal can be determined via comparing the profile of the TV signal with a predetermined profile. Therefore, the steps and hardware for determining the type of the TV signal can be simplified.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
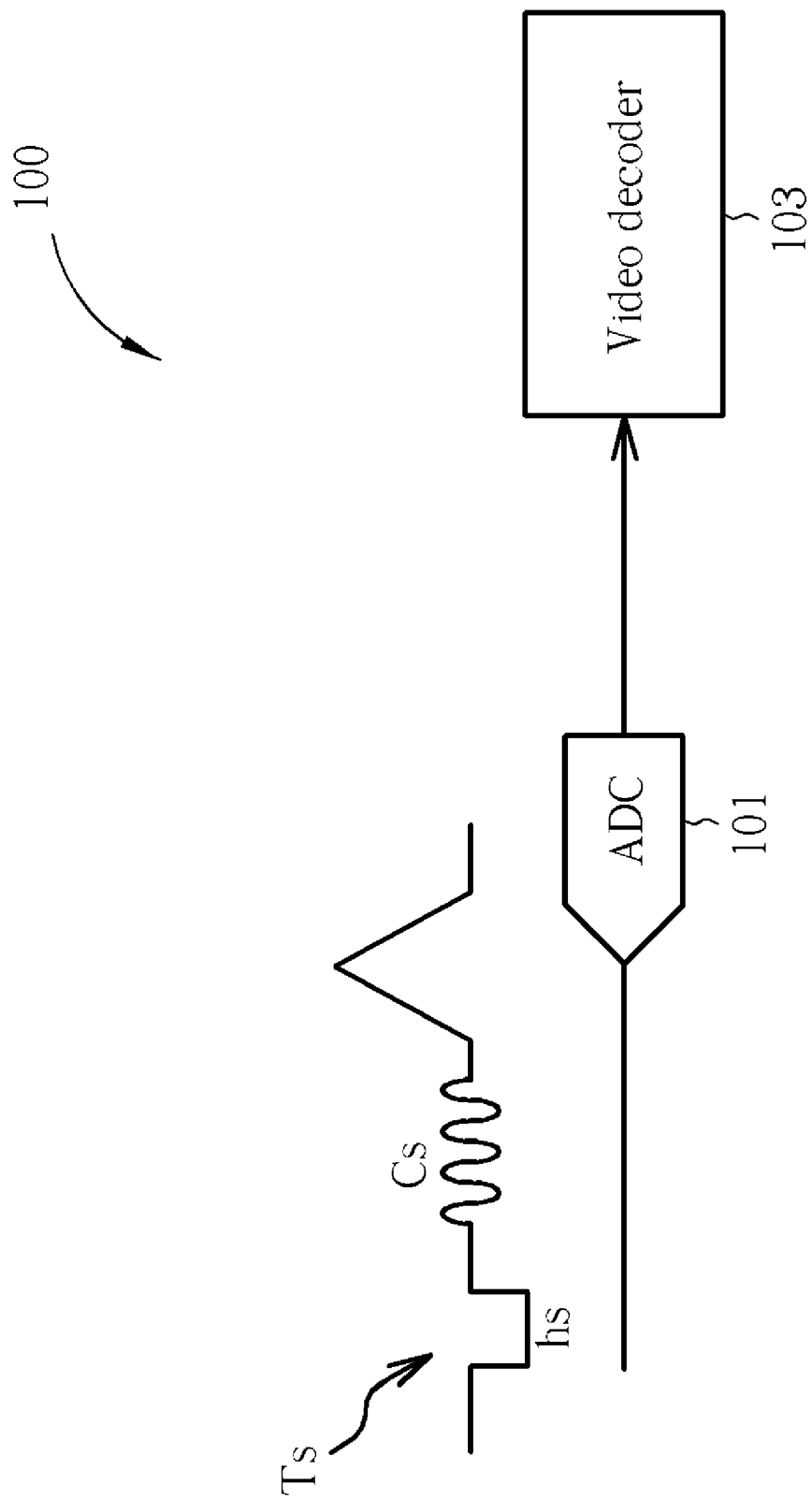
FIG. 1 is a block diagram illustrating a prior art TV signal processing system.
Figure 2:
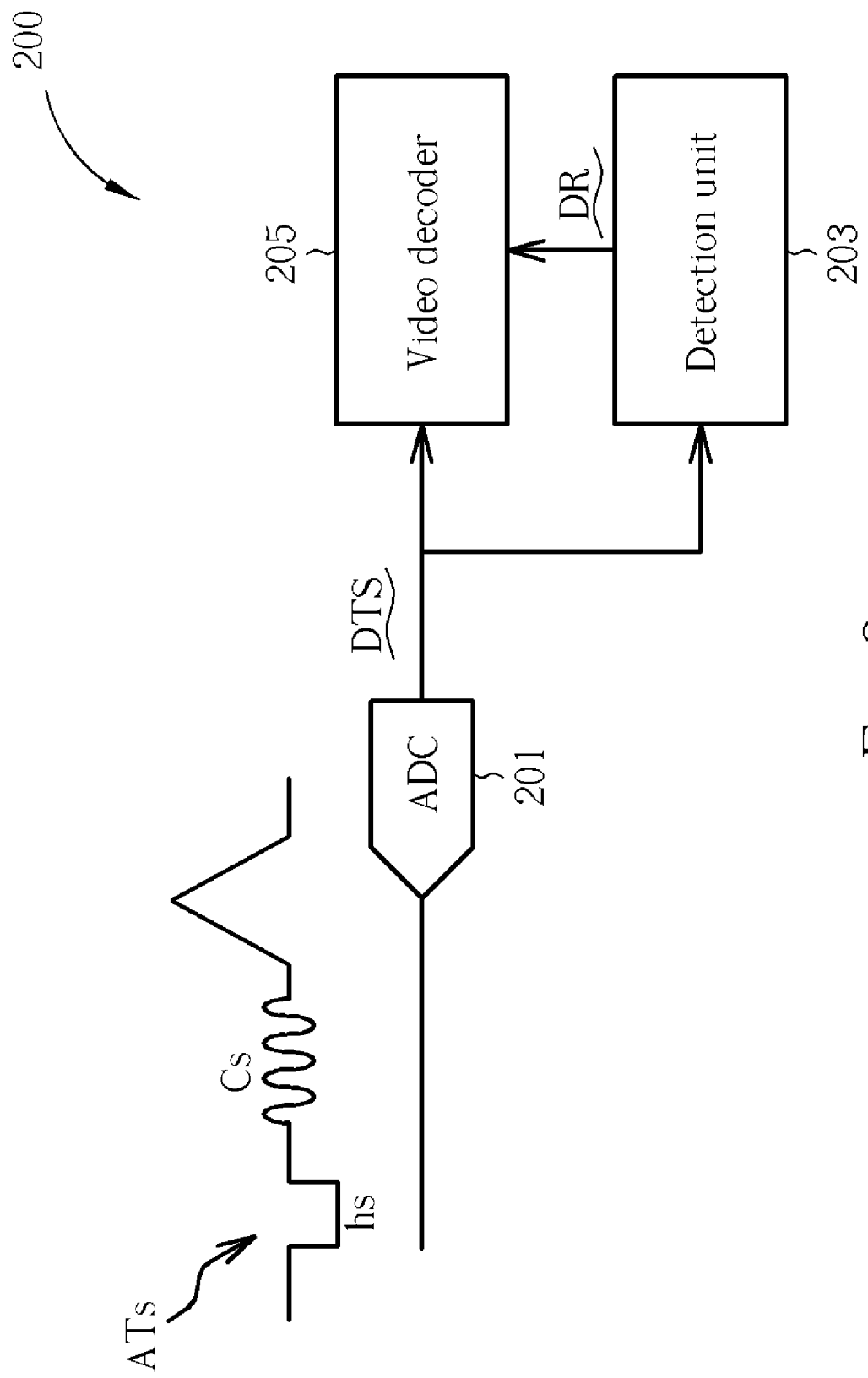
FIG. 2 is a block diagram illustrating a TV signal processing system according to an embodiment of the present invention.

FIG. 2 is a block diagram illustrating a TV signal processing system according to an embodiment of the present invention. As shown in FIG. 2, the TV signal processing system 200 comprises an ADC 201, a detection unit 203 and a video decoder 205. The ADC 201 is utilized for sampling an analog TV signal ATS to generate a digital TV signal DTS. The detection unit 203 is used for utilizing a predetermined profile to detect if the digital TV signal DTS has a signal segment corresponding to the predetermined profile to generate a detection result signal DR. The video decoder 205, which is coupled to the detection unit 203, is used for processing the digital TV signal DTS according to the detection result signal DR.

Figure 3:
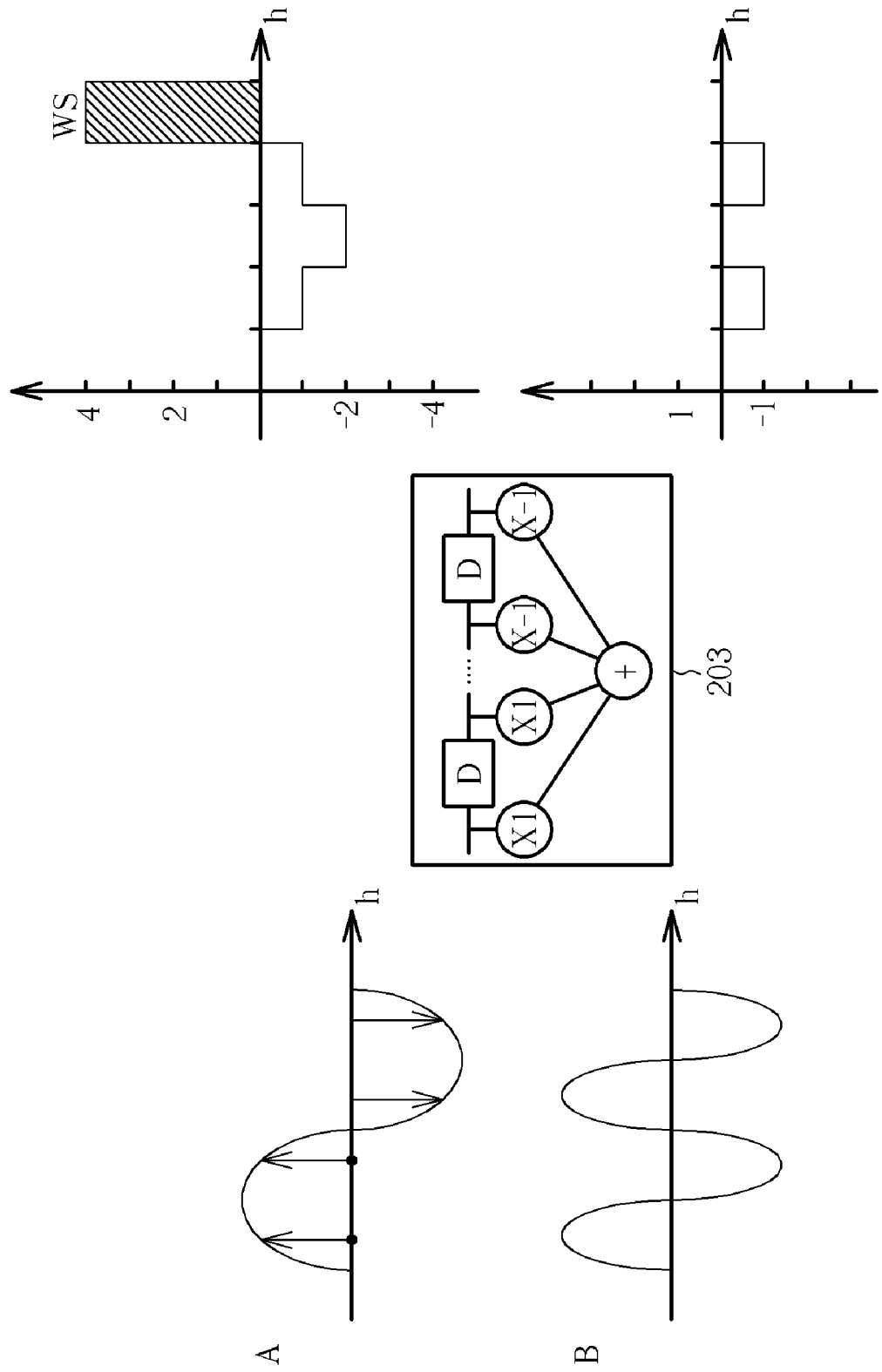
FIG. 3 is a schematic diagram illustrating the operation of the detection unit shown in FIG. 2.

FIG. 3 is a schematic diagram illustrating the operation of the detection unit 203 shown in FIG. 2. In this case, the detection unit 203 is a matched filter, which can utilize the delay stages and coefficient corresponding to the delay stages for deciding a predetermined profile. The detection result signal DR is a weighted signal WS. If the inputted profile more closely matches the predetermined profile, the weighted signal will have a higher weight value. By contrast, if the inputted profile is more different from the predetermined profile, the weighted signal will have a lower weight value.

For example, signal A has a profile matching the predetermined profile decided by the matched filter. Therefore the weighted signal WS corresponding to the signal A has high weight value. Oppositely, signal B has a profile that does not match the predetermined profile determined by the matched filter. Thus the weighted signal WS corresponding to the signal B has low weight value.

Therefore, according to the above mentioned system, the predetermined profile can be set to a profile of a color sub-carrier following a specific TV standard, and the number of the delay stages corresponds to the color sub-carrier. Thus, if the detection result signal has high weight value, the TV signal is determined to have a color sub-carrier having the predetermined profile, and the TV signal follows the specific TV standard accordingly. Then, the video decoder can utilize the specific TV standard to decode the TV signal. Specifically, the video decoder 205 locks a v-sync signal and an h-sync signal of the TV signal according to the detection result signal DR.

It should be noted that although the detection unit is utilized for detecting a digital TV signal in the above-mentioned embodiment, the detection unit can also be utilized for detecting an analog TV signal. Moreover, the detection unit is not limited to utilizing a matched filter, and persons skilled in the art can easily utilize other structures to meet the same function.

Additionally, the detection result signal DR is not limited to be transmitted to the video decoder. The detection result signal DR can be transmitted to a determining unit (not illustrated) to determine which TV standard the TV signal complies with. Then the determining result can be outputted for any other objective. In this case, the determining unit and the detection result can be regarded as a TV signal determining system.

According to above-mentioned embodiment, a TV signal determining method corresponding to the above-mentioned TV signal determining system can be obtained. The TV signal determining method comprises: utilizing a predetermined profile to detect if the TV signal has a signal segment corresponding to the predetermined profile to generate a detection result signal; and determining the type of the TV signal according to the detection result signal.

According to above-mentioned embodiment, a TV signal processing method corresponding to the above-mentioned TV signal processing system can be obtained. The TV signal processing method comprises: utilizing a predetermined profile to detect if the TV signal has a signal segment corresponding to the predetermined profile to generate a detection result signal; and decoding the TV signal according to the detection result signal.

According to above-mentioned systems and methods, the type of the TV signal can be determined via comparing the profile of the TV signal with a predetermined profile. Therefore, the steps and hardware for determining the type of the TV signal can be simplified.

Those skilled in the art will readily observe that numerous modifications and alterations of the device and method may be made while retaining the teachings of the invention.

What is claimed is:

1. A TV signal determining system, for determining a type of a TV signal, comprising:
    a detection unit, for utilizing a predetermined profile to detect if the TV signal has a signal segment corresponding to the predetermined profile to generate a detection result signal; and
    a determining unit, coupled to the detection unit, for determining the type of the TV signal according to the detection result signal, wherein the detection unit is a matched filter including at least one delay stage corresponding to at least one coefficient.

2. The TV signal determining system of claim 1, wherein the detection result signal is a weighted signal, where the weighted signal has a higher weight value for the signal segment when a profile of the signal segment more closely matches the predetermined profile.

3. The TV signal determining system of claim 1, wherein the predetermined profile is a color sub-carrier profile corresponding to a specific TV standard, and the number of delay stages corresponds to the color sub-carrier profile.

4. The TV signal determining system of claim 1, wherein the TV signal is a digital TV signal, the detection unit operates in a digital domain, and the TV signal determining system further comprises an analog to digital converter (ADC) for converting an analog TV signal into the digital TV signal.

5. A TV signal processing system, comprising:
    a detection unit, for utilizing a predetermined profile to detect if a TV signal has a signal segment corresponding to the predetermined profile to generate a detection result signal; and
    a video decoder, coupled to the detection unit, for processing the TV signal according to the detection result signal; wherein the detection unit is a matched filter including at least one delay stage corresponding to at least one coefficient.

6. The TV signal processing system of claim 5, wherein the detection result signal is a weighted signal, where the weighted signal has a higher weight value for the signal segment when a frequency of the signal segment more closely matches the predetermined profile.

7. The TV signal processing system of claim 5, wherein the predetermined profile is a color sub-carrier profile corresponding to a specific TV standard, and the number of delay stages corresponds to the sub-carrier profile.

8. The TV signal processing system of claim 5, wherein the TV signal is a digital TV signal, the detection unit operates in a digital domain, and the TV signal determining system further comprises an analog to digital converter (ADC) for converting an analog TV signal into the digital TV signal.

9. The TV signal processing system of claim 5, wherein the video decoder locks a vertical sync signal and a horizontal sync signal of the TV signal according to the detection result signal.

10. A TV signal determining method, for determining a type of a TV signal, comprising:
    utilizing a predetermined profile to detect if the TV signal has a signal segment corresponding to the predetermined profile to generate a detection result signal; and
    determining the type of the TV signal according to the detection result signal, wherein the detection result signal is a weighted signal, where the weighted signal has a higher weight value for the signal segment when a profile of the signal segment more closely matches the predetermined profile.

11. The TV signal determining method of claim 10, wherein the predetermined profile is a color sub-carrier profile corresponding to a specific TV standard.

12. The TV signal determining method of claim 10, wherein the TV signal is a digital TV signal, the detection unit operates in a digital domain, and the TV signal determining method further comprises converting an analog TV signal into the digital TV signal.

13. A TV signal processing method, comprising:
utilizing a predetermined profile to detect if a TV signal has a signal segment corresponding to the predetermined profile to generate a detection result signal; and
decoding the TV signal according to the detection result signal, wherein the detection result signal is a weighted signal, where the weighted signal has a higher weight value for the signal segment when a profile of the signal segment more closely matches the predetermined profile.

14. The TV signal processing method of claim 13, wherein the predetermined profile is a color sub-carrier profile corresponding to a specific TV standard.

15. The TV signal processing method of claim 13, wherein the TV signal is a digital TV signal, the detection unit operates in a digital domain, and the TV signal determining method further comprises converting an analog TV signal into the digital TV signal.

16. The TV signal processing method of claim 13, wherein the step of decoding the TV signal locks a vertical sync signal and a horizontal sync signal of the TV signal according to the detection result signal.

17. A TV signal determining system, for determining a type of a TV signal, comprising:
a detection unit, for utilizing a predetermined profile to detect if the TV signal has a signal segment corresponding to the predetermined profile to generate a detection result signal; and
a determining unit, coupled to the detection unit, for determining the type of the TV signal according to the detection result signal, wherein the detection result signal is a weighted signal, where the weighted signal has a higher weight value for the signal segment when a profile of the signal segment more closely matches the predetermined profile.

18. A TV signal processing system, comprising:
a detection unit, for utilizing a predetermined profile to detect if a TV signal has a signal segment corresponding to the predetermined profile to generate a detection result signal; and
a video decoder, coupled to the detection unit, for processing the TV signal according to the detection result signal, wherein the detection result signal is a weighted signal, where the weighted signal has a higher weight value for the signal segment when a frequency of the signal segment more closely matches the predetermined profile.

* * * * *